United States Patent
Jeon et al.

(10) Patent No.: US 7,075,727 B2
(45) Date of Patent: Jul. 11, 2006

(54) PROJECTION LENS SYSTEM FOR IMAGE PROJECTION APPARATUS

(75) Inventors: Kee-Uk Jeon, Suwon (KR); Yong-Dok Cha, Suwon (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 581 days.

(21) Appl. No.: 10/610,596

(22) Filed: Jul. 2, 2003

(65) Prior Publication Data

US 2004/0027497 A1 Feb. 12, 2004

(30) Foreign Application Priority Data

Jul. 2, 2002 (KR) .................. 10-2002-0038054

(51) Int. Cl.
*G02B 3/00* (2006.01)
*G02B 13/18* (2006.01)

(52) U.S. Cl. .................... 359/649; 359/708
(58) Field of Classification Search ................ 359/649, 359/650, 651, 708
See application file for complete search history.

(56) References Cited

U.S. PATENT DOCUMENTS

| | | | | |
|---|---|---|---|---|
| 5,914,820 A | * | 6/1999 | Takimoto et al. | 359/686 |
| 6,275,343 B1 | * | 8/2001 | Takamoto et al. | 359/749 |
| 6,476,981 B1 | * | 11/2002 | Shikama | 359/750 |
| 6,542,316 B1 | * | 4/2003 | Yoneyama | 359/749 |

* cited by examiner

*Primary Examiner*—Scott J. Sugarman
(74) *Attorney, Agent, or Firm*—Sughrue Mion, PLLC

(57) ABSTRACT

A projection lens system for an image projection apparatus that enhances the image aberration correction rate to achieve high resolution and luminance. The lens system includes a first lens group having first and second spherical lenses of positive refraction power movable along an optical axis, a second lens group having a third doublet lens formed with a lens of positive refraction power and a lens of negative refraction power in junction to correct chromatic aberration, and a fourth spherical lens to correct spherical aberration, a third lens group having lenses of positive refraction power, and a fourth lens group for correcting distortions having a seventh spherical lens being concave on both surfaces thereof, an eighth spherical lens of negative refraction power having a concave surface on one side and a convex surface on the other side, and a ninth lens of negative refraction power having an aspheric surface.

5 Claims, 4 Drawing Sheets

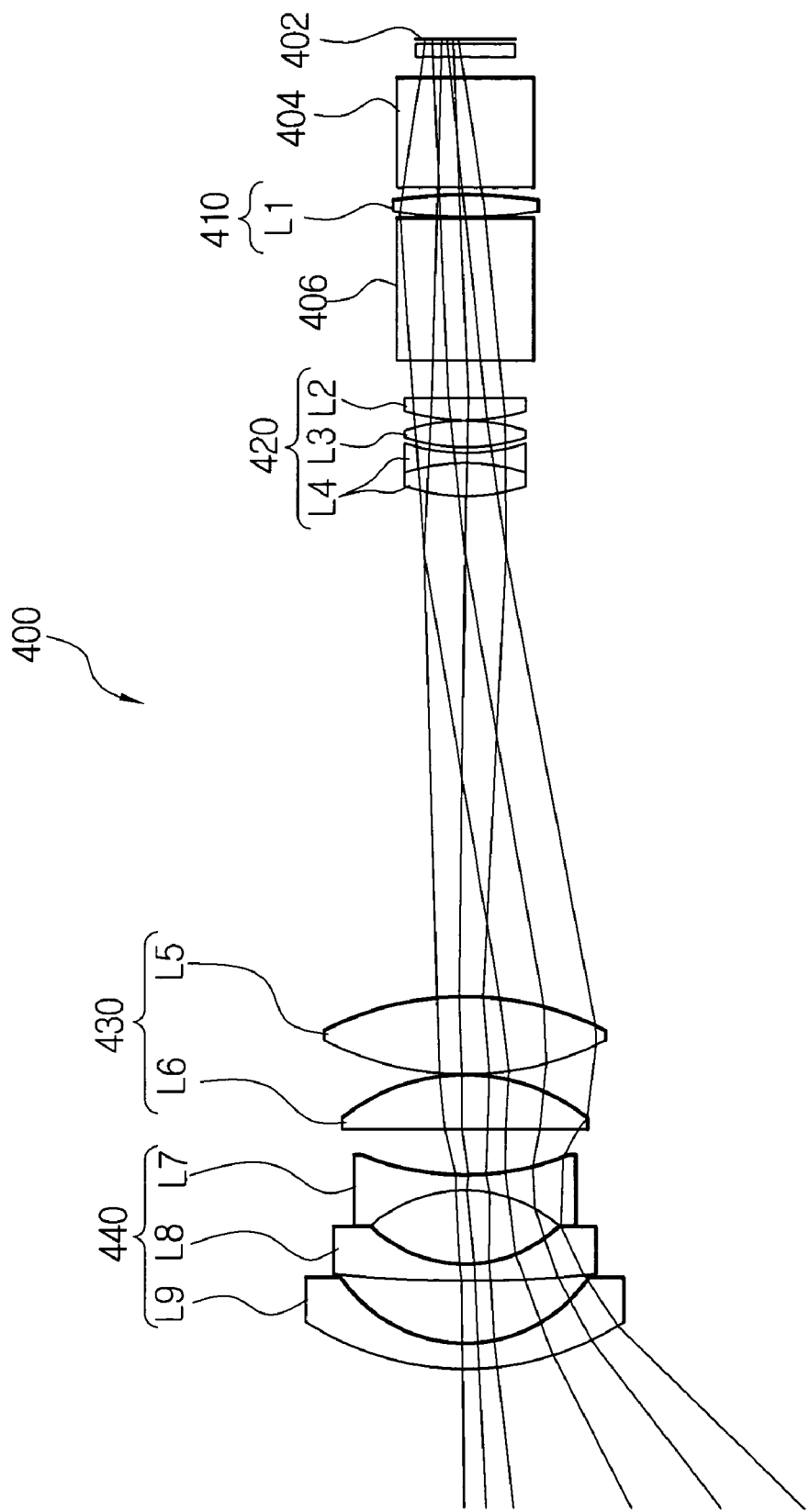

PROJECTION LENS SYSTEM FOR IMAGE PROJECTION APPARATUS

BACKGROUND OF THE INVENTION

The present Application claims priority from Korean Patent Application Number 10-2002-0038054 filed in the Republic of Korea on Jul. 2, 2002, which is incorporated in-full herein by reference.

1. Field of the Invention

The present invention relates to a projection lens system applied to a video image projection apparatus, and more particularly to a projection lens system for improving an aberration correction factor to implement images of high resolution and high luminance.

2. Description of the Prior Art

Recently, the demand for image display devices larger in size and of higher quality has increased. Accordingly, image projection that enlarge and project small images by using projection lenses are rapidly becoming popular. Such image projection apparatus are mainly classified into front projection apparatus and rear projection apparatus based on projection methods.

Front image projection apparatus employ a method projecting a video signal from the front of the screen, which are generally used in movie theaters, conference rooms, and so on, whereas the rear image projection apparatus employ a method projecting a video signal from the rear of the screen, which has been popularized in the form of projection TV. In particular, the rear image projection apparatus can display relatively bright images even in bright ambient environments, so they are used more compared to the front image projection apparatus.

FIG. 1 is a view for showing a general rear image projection apparatus.

In FIG. 1, a rear image projection apparatus 100 has a light source 110, a panel 120, a projection lens system 130, a mirror 140, and a screen 150.

The light source 110 generates and emits light by using halogen, xenon, and so on. The panel 120 is a display device producing images by using light emitted from the light source 110. A cathode-ray tube (CRT), a liquid crystal display panel (LCD), a digital micromirror device (DMD), or the like is used for the panel 120.

The projection lens system 130 enlarges and projects the images produced on the panel 120 in a predetermined magnification power. The projection lens system 130 includes plural plastic lenses or glass lenses. That is, the magnification power of the projection lens system 130 is determined by the plural lenses.

The mirror 140 creates the total reflection of enlarged images projected from the projection lens system 130 toward the rear of the screen. The totally reflected images are focused on the screen 150, by which a user can view the images focused on the screen 150.

However, in the conventional rear image projection apparatus 100, the projection lens system 130 has plural lenses, causing a problem that raises the cost of the rear image projection apparatus 100 and makes it difficult to manufacture the rear image projection apparatus 100 thin. However, the number of lenses is reduced in order to solve such a problem, causing a problem that the quality of images displayed on the screen 150 is entirely deteriorated by aberration, distortion, and so on.

SUMMARY OF THE INVENTION

Accordingly, it is an object of the present invention to provide a projection lens system for image projection apparatus capable of correcting optical aberration with the less number of lenses provided in the projection lens system.

In order to achieve the object, in a projection lens system for image projection apparatus which magnifies and projects on a screen images reflected from a panel and past through a prism, the projection lens system comprises a first lens group having first and second spherical lenses of positive refraction power, and moving along an optical axis; a second lens group having a third combination lens formed with a lens of positive refraction power and a lens of negative refraction power in junction to correct chromatic aberration, and a fourth spherical lens being convex on both surfaces thereof to correct spherical aberration; a third lens group having fifth and sixth spherical lenses of positive refraction power; and a fourth lens group having a seventh spherical lens being concave on both surfaces thereof, an eighth spherical lens of negative refraction power having a concave surface on one side thereof which is opposite to the seventh spherical lens and a convex surface on the other side thereof, and a ninth aspheric lens of negative refraction power having an aspheric surface on at least one side thereof, and arranged for distortion corrections, and the first to fourth lens groups being sequentially arranged in a direction toward the screen from the prism.

In more detail, the projection lens system further includes a reflection mirror arranged on an optical path between the second lens group and the third lens group and for reflecting the incident images at a predetermined angle.

In the meantime, in an image display apparatus having a polarizing beam splitter for separating R, G, and B video signals reflected from a panel into polarized lights of P and S, and a color cube for synthesizing the R, G, and B video signals past through the polarizing beam splitter to magnify and project on the screen an composite image past through the color cube, the projection lens system includes a first lens group having a first spherical lens of positive refraction power, and arranged between the polarizing beam splitter and the color cube; a second lens group having a second spherical lens of positive refraction power, a third spherical lens of positive refraction power, and a fourth combination lens formed with a lens of positive refraction power and a lens of negative refraction power in junction to correct chromatic aberration, and arranged following the color cube; a third lens group having fifth and sixth spherical lenses of positive refraction power; and a fourth lens group having a seventh spherical lens being concave on both surfaces thereof, an eighth spherical lens of negative refraction power having a concave surface on one side thereof which is opposite to the seventh spherical lens and a convex surface on the other side thereof, and a ninth aspheric lens of negative refraction power having an aspheric surface on at least one side thereof, and arranged for distortion corrections, and the first to fourth lens groups being sequentially arranged in a direction toward the screen from the polarizing beam splitter.

In more detail, the projection lens system further comprises a reflection mirror arranged on an optical path between the second lens group and the third lens group and for reflecting the image at a predetermined angle.

BRIEF DESCRIPTION OF THE DRAWINGS

The above object and other features of the present invention will become more apparent by describing in detail a preferred embodiment thereof with reference to the attached drawings, in which:

FIG. 4 is a view for showing a projection lens system for image projection apparatus according to another embodiment of the present invention.

DETAILED DESCRIPTION OF THE PREFERRED EMBODIMENTS

Hereinafter, the present invention will be described in detail with reference to the accompanying drawings.

Figure 1:
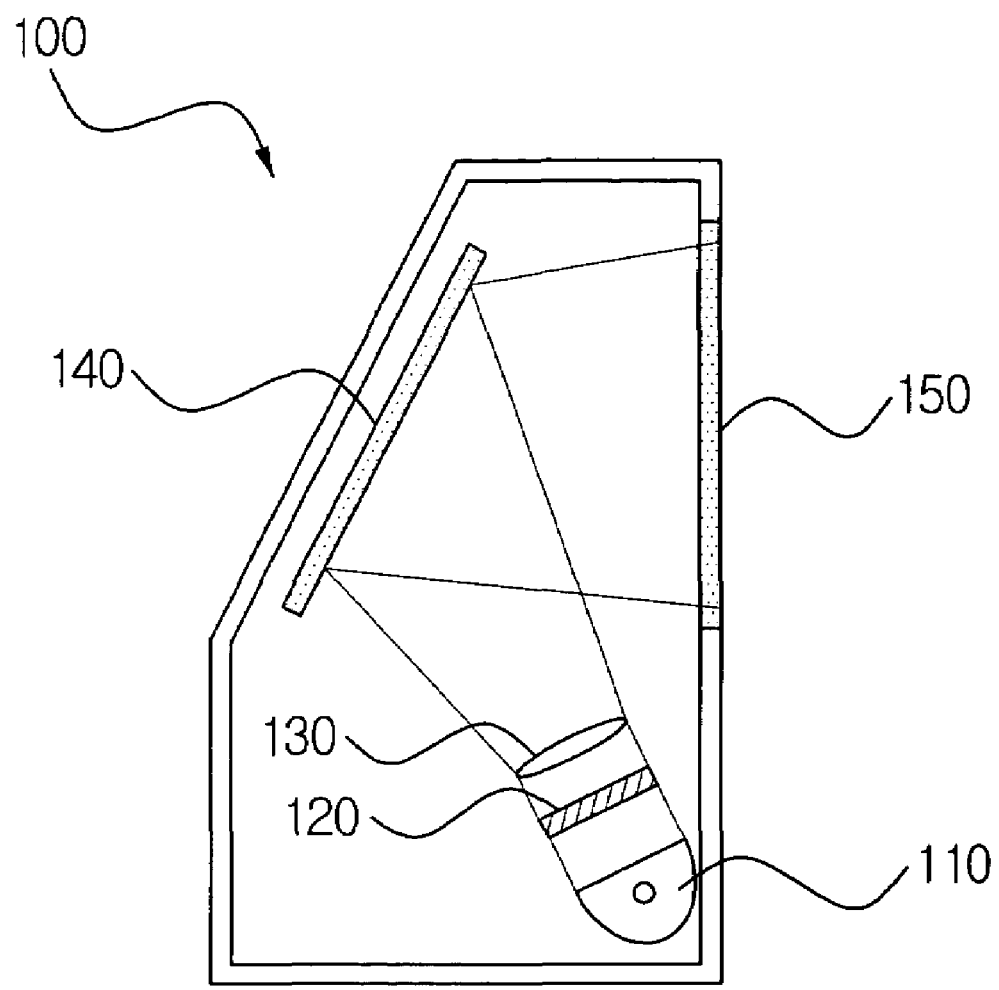
FIG. 1 is a view for showing a general rear image projection apparatus.
Figure 2:
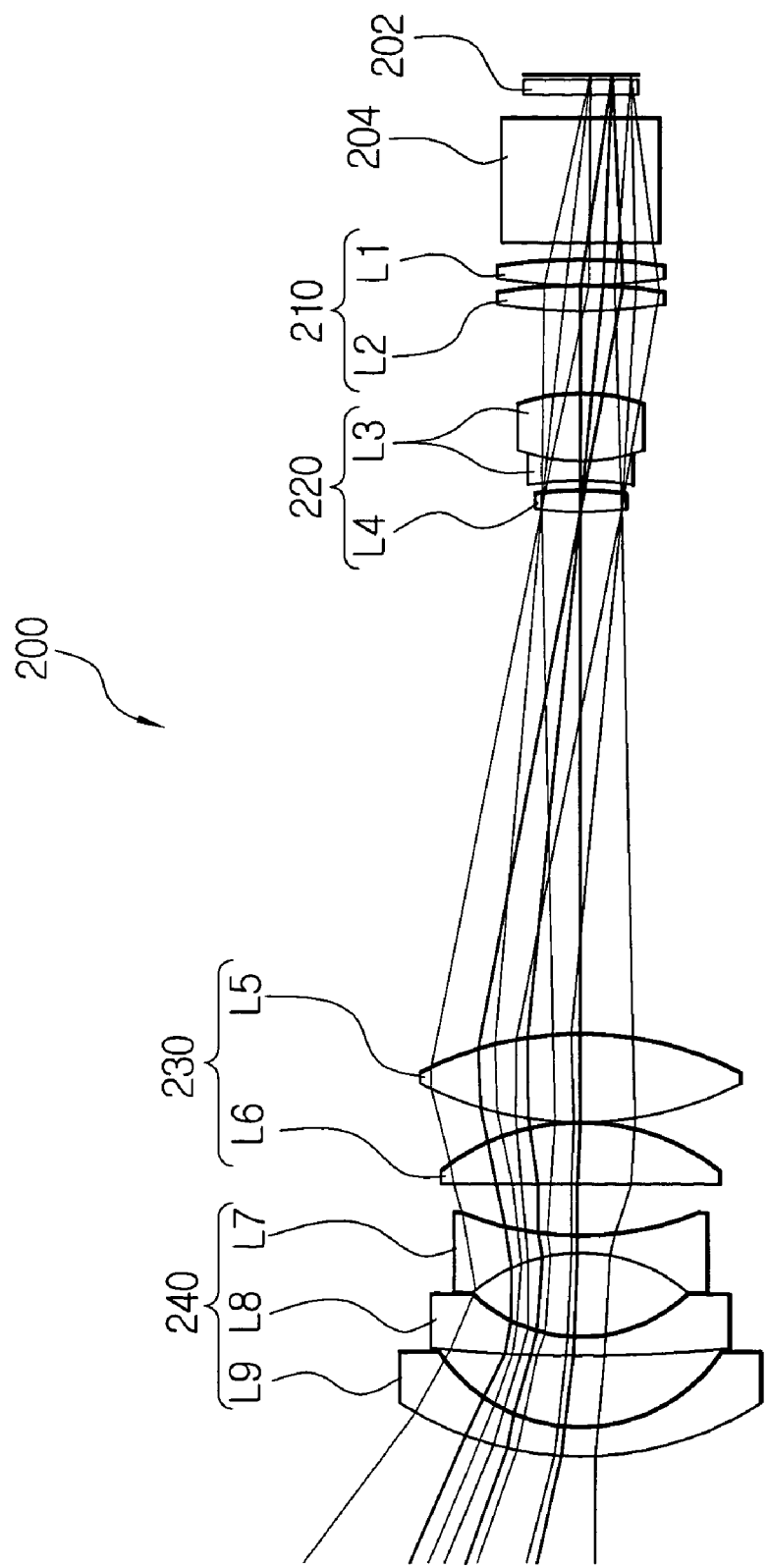
FIG. 2 is a view for showing a projection lens system for image projection apparatus according to a preferred embodiment of the present invention.

FIG. 2 is a view for showing a projection lens system for image projection apparatus according to a preferred embodiment of the present invention.

A projection lens system 200 consists of plural lenses magnifying and projecting on a screen (not shown) images reflected from a panel 202 and passed through the prism 204. Provided in an image projection device (not shown) are the panel 202, prism 204, projection lens system 200, and screen (not shown).

The panel 202 uses a digital micromirror device (DMD) element, a cathode-ray tube (CRT) element or a liquid crystal display (LCD) element. When the panel 202 uses the LCD element, an image is reflected from the panel 202 and penetrates the prism 204. The image passed through the prism 204 enters the projection lens system 200.

Referring to FIG. 2, the projection lens system 200 of the present invention has first to fourth lens groups 210, 220, 230, and 240. Further, the first to fourth lens groups 210, 220, 230, and 240 are sequentially arranged on an optical axis from the prism 204 to the screen (not shown). The lenses of the first to fourth lens groups 210, 220, 230, and 240 are formed of glass or plastic material.

The first lens group 210 has first and second spherical lenses L1 and L2. The first and second spherical lenses L1 and L2 have a positive refraction power to converge an image incident from the prism 204, respectively. The first and second spherical lenses L1 and L2 are movably installed in forward and backward directions with respect to the optical axis by a driving source (not shown), which requires minute adjustments to control a projection distance.

The second lens group 220 has a third doublet lens L3 and a fourth spherical lens L4. The third doublet lens L3 has a lens of positive refraction power and a lens of negative refraction power both of which are in junction to correct chromatic aberration. That is, the third doublet lens L3 is formed with a divergence lens and a convergence lens in junction and correct the chromatic aberration of images incident from the second spherical lens L2. A fourth spherical lens L4 is convex on both sides thereof so that it has a positive refraction power, and the refraction power is determined to correct the spherical aberration of images incident from the third doublet lens L3.

The second lens group 220 has a positive or a negative refraction power, and the addition of the refraction powers of the first and second lens groups 210 and 220 produces a positive refraction power.

The third lens group 230 has fifth and sixth spherical lenses L5 and L6. The fifth and sixth spherical lenses L5 and L6 have a positive refraction power and converge images incident from the fourth spherical lens L4 to the fourth lens group 240.

The fourth lens group 240 for distortion corrections has a seventh spherical lens L7, an eighth spherical lens L8, and a ninth aspheric lens L9. The seventh spherical lens L7 is in a concave shape on both sides thereof, and diverges images incident from the sixth spherical lens L6. The eighth spherical lens L8 has a concave surface opposite to the seventh spherical lens L7, and the eight spherical lens L8 also has a convex surface opposite to the concave surface. The ninth aspheric lens L9 has at least one aspheric surface and plays the primary role in correcting distortions.

The seventh spherical lens L7, eighth spherical lens L8, and ninth aspheric lens L9 respectively have a negative refraction power, by which images incident from the fourth lens group L4 diverge to a screen (not shown).

At this time, the images displayed on the screen (not shown) are magnified by a predetermined magnification factor for displays.

Table 1 shows an implementation of curvatures, thickness, refraction powers and materials of various lenses used in the projection lens system of FIG. 2, according to a preferred embodiment of the invention.

TABLE 1

| | Curvature radius | Lens thickness (mm) Distance between lenses(mm) | Refraction power | Device material |
|---|---|---|---|---|
| SCREEN | Infinity | | | |
| | | 680.0 | | |
| L9 | R1 = 175.6 | 5.5 | 492.57 | PMMA |
| | R2 = 41.4 | 10.4 | | |
| L8 | R1 = 147.9 | 4.0 | 658.51 | BACED5_HOYA |
| | R2 = 30.9 | 18.8 | | |
| L7 | R1 = −35.9 | 3.5 | 658.51 | BACED5_HOYA |
| | R2 = 62.58 | 14.8 | | |
| L6 | R1 = −562.4 | 11.5 | 672.32 | EFD5_HOYA |
| | R2 = −56.1 | 0.2 | | |
| L5 | R1 = 100.6 | 14.5 | 622.58 | BACD15_HOYA |
| | R2 = −100.6 | 82.0 | | |
| L4 | R1 = 52.7 | 5.0 | 638.55 | BACD18_HOYA |
| | R2 = −52.7 | 0.8 | | |
| L3' | R1 = −39.7 | 5.0 | 755.28 | EFD4_HOYA |
| | R2 = 22.8 | 0.0 | | |
| L3 | R1 = 22.8 | 12.0 | 487.00 | FC5_HOYA |
| | R2 = −42.8 | 10.9 | | |
| L2 | R1 = 193.8 | 4.2 | 516.64 | BSC7_HOYA |
| | R2 = −193.8 | 0.2 | | |
| L1 | R1 = 71.1 | 5.0 | 755.28 | EFD4_HOYA |
| | R2 = −71.1 | 3.0 | | |
| PRISM | R1 = infinity | 25.0 | 516.64 | BSC7_HOYA |
| | R2 = infinity | 4.8 | | |

In Table 1, R1 applied in FIG. 2 indicates a curvature radius of the front surface of each of the lenses L1 to L9 which faces the screen (not shown) and R2 a curvature radius of the opposite surface of the same, the thickness indicates a thickness of each of the lenses L1 to L9, the distance indicates a distance between lenses, the refraction power indicates a refraction power of each of the lenses L1 to L9, the material indicates lens product names released from lens manufacturers. Further, The L3 and L3' indicate the doublet lenses for chromatic aberration corrections.

TABLE 2

| Aspheric coefficient | A | B | C | D |
|---|---|---|---|---|
| R1 | 0.483473E−05 | −.266631E−08 | 0.120474E−11 | −.222055E−15 |
| R2 | 0.659158E−06 | −.757074E−10 | −.549746E−11 | 0.169016E−14 |

Table 2 indicates the aspheric coefficients of the ninth aspherical lens L9 provided in the projection lens system 200, and, in the expressions as to the center of an optical lens surface to the height, the A indicates a coefficient for a height powered by 4, B a coefficient for a height powered by 6, C a coefficient for a height powered by 8, and D a coefficient for a height powered by 10.

Figure 3:
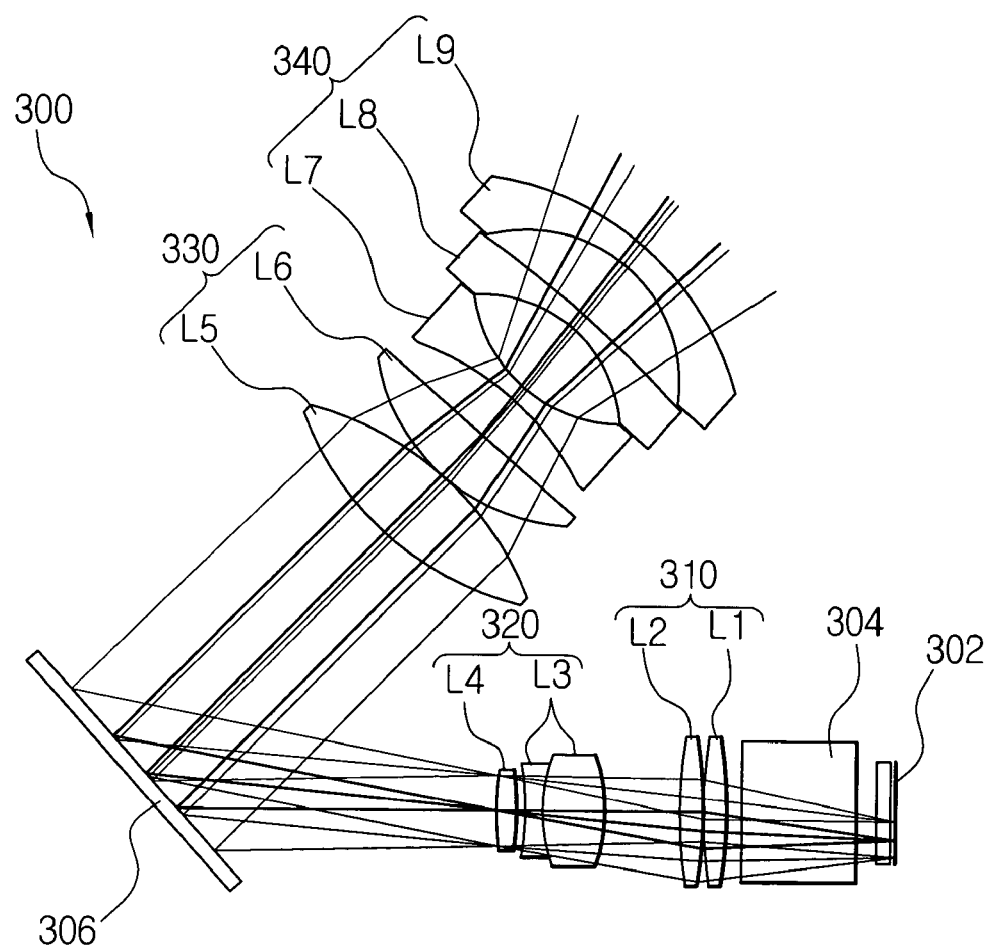
FIG. 3 is a view for showing a projection lens system provided with a reflection mirror according to a preferred embodiment of the present invention.

FIG. 3 is a view for showing a projection lens system provided with a reflection mirror according to a preferred embodiment of the present invention.

Referring to FIG. 3, a projection lens system 300 has first to fourth lens groups 310, 320, 330, and 340, and a reflection mirror 306 is provided between the second lens group 320 and the third lens group 330. The projection lens system 300 is provided to an image projection apparatus (not shown) together with a panel 302, a prism 304, a reflection mirror 306, and a screen (not shown).

The structures and functions of the first to fourth lens groups 310, 320, 330, and 340 of FIG. 3 are the same as those of the first to fourth lens groups 210, 220, 230, and 240, so detailed descriptions on the structures and functions of the first to fourth lens groups 310, 320, 330, and 340 of FIG. 3 are omitted.

The first lens group 310 has first and second spherical lenses L1 and L2. The second lens group 320 has a third doublet lens L3 and a fourth spherical lens L4.

The third lens group 330 has fifth and sixth spherical lenses L5 and L6 having a positive refraction power. The fourth lens group 340 has a seventh spherical lens L7, an eighth spherical lens L8, and a ninth aspherical lens L9.

An image reflected from the panel 302 formed of DMD and past through the prism 304 comes incident to the first lens group 310. The first lens group 310 having a positive refraction power converges the image past through the prism 304 to the second lens group 320. The second lens group 320 has a positive or a negative refraction power, and diverges the converged image to the reflection mirror 306.

The reflection mirror 306 creates the total reflection of the diverged image by the second lens group 320, and changes light paths of the image of total reflection based on a slope of the reflection mirror 306 provided in the image projection device (not shown). The change of the light paths enables the projection lens system 300 to be reduced in size, the projection lens system 300 being arranged in line along an optical axis.

The third lens group 330 having a positive refraction power converges the image of total refraction into the fourth lens group 340. Further, the fourth lens group 340 corrects the distortions of the converged image, and diverges the distortion-corrected image to the screen (not shown).

FIG. 4 is a view for showing a projection lens system for an image projection apparatus according to another embodiment of the present invention.

Referring to FIG. 4, the image projection device (not shown) has a polarizing beam splitter (PBS) 404 for splitting R, G, and B video signals reflected from the panel 302 into polarized lights of P and S, a color cube 406 for compositing the R, G, and B video signals passed through the PBS 404, and a projection lens system 400 for enlarging and projecting the composite image passed through the color cube 406 to the screen (not shown). Further, the projection lens system 400 according to the present invention has first to fourth lens groups 410, 420, 430, and 440.

The first lens group 410 has at least one first spherical lens L1. The first spherical lens L1 having a positive refraction power converges video signals incident from the PBS 404. The color cube 406 composites the converged R, G, and B video signals.

The second lens group 420 has a second spherical lens L2, a third spherical lens L3, and a fourth doublet lens L4 which are sequentially arranged following the color cube 406. The second and third spherical lenses L2 and L3 have a positive refraction power. The fourth doublet lens L4 has a lens of positive refraction power and a lens of negative refraction power in junction to correct chromatic aberration. The fourth doublet lens L4 corrects the chromatic aberration of the composite image incident from the third spherical lens L3.

The structures and functions of the third and fourth lens groups 430 and 440 are the same as those of the third and fourth lens groups 230 and 240 of FIG. 2, so detailed descriptions on the structures and functions of the third and fourth lens groups 430 and 440 will be omitted.

The third lens group 430 has fifth and sixth spherical lenses L5 and L6 each having a positive refraction power, by which the third lens group 430 converges the chromatic aberration-corrected composite image to the fourth lens group 440.

The fourth lens group 440 for correcting distortions has a seventh spherical lens L7, an eighth spherical lens L8, and a ninth aspheric lens L9. The fourth lens group 440 corrects the distortions of the converged image and diverges to the screen (not shown). At this time, the images displayed on the screen (not shown) are magnified by a predetermined magnification factor by the projection lens system 400 for displays.

Table 3 shows an implementation of curvatures, thickness, refraction powers, and materials of various lenses used in the projection lens system of FIG. 4, according to preferred embodiment of the invention.

TABLE 3

|  | Curvature radius | Lens thickness(mm) Distance between lenses(mm) | Refraction power | Device material |
|---|---|---|---|---|
| SCREEN | Infinity | | | |
| | | 571.0 | | |
| L9 | R1 = 720.756 | 5.5 | 492000.571 | PMMA |
| | R2 = 43.203 | 10.377 | | |
| L8 | R1 = 183.998 | 5.0 | 658436.5085 | BACED5_HOYA |
| | R2 = 36.000 | 19.123 | | |
| L7 | R1 = −46.809 | 5.0 | 622994.5812 | BACED15_HOYA |
| | R2 = 65.772 | 9.9 | | |
| L6 | R1 = −600.000 | 8.0 | 620040.363 | E2_HOYA |
| | R2 = −85.608 | 0.1 | | |
| L5 | R1 = 101.044 | 15.0 | 620040.363 | E2_HOYA |
| | R2 = −101.044 | 113.9 | | |
| L4' | R1 = 55.488 | 6.0 | 487489.7044 | FC5_HOYA |
| | R2 = −55.488 | 0.0 | | |
| L4 | R1 = −55.488 | 3.0 | 723417.3799 | BAFD8_HOYA |
| | R2 = 55.488 | 3.0 | | |
| L3 | R1 = 124.773 | 6.0 | 516798.642 | BSC7_HOYA |
| | R2 = −55.488 | 0.1 | | |
| L2 | R1 = 36.198 | 5.0 | 516798.642 | BSC7_HOYA |
| | R2 = −90.995 | 7.0 | | |
| COLOR CUBE | R1 = infinity | 36.0 | 516798.642 | BSC7_HOYA |
| | R2 = infinity | 0.5 | | |
| L1 | R1 = 62.568 | 5.5 | 492000.571 | PMMA |
| | R2 = −58.081 | 2.0 | | |
| PBS | R1 = infinity | 32.0 | 647693.3384 | FD2_HOYA |
| | R2 = infinity | 3.584 | | |

In Table 3, R1 applied in FIG. 4 indicates a curvature radius of the front surface of each of the lenses L1 to L9 which faces the screen (not shown) and R2 a curvature radius of the opposite surface of the same, the thickness indicates a thickness of each of the lenses L1 to L9, the distance indicates a distance between lenses, the refraction power indicates a refraction power of each of the lenses L1 to L9, the device material indicates lens product names released from lens manufacturers. Further, The L4 and L4' indicate the doublet lenses for chromatic aberration corrections.

TABLE 4

| Aspheric coefficient | A | B | C | D |
|---|---|---|---|---|
| R1 | 0.916502E−06 | −.387214E−07 | 0.236422E−09 | −.511615E−12 |
| R2 | 0.102705E−04 | −.563963E−07 | −.317207E−09 | 0.653430E−12 |

Table 4 indicates the aspheric coefficients of the ninth aspheric lens L9 provided in the projection lens system 400, and, in the expressions as to the center of an optical lens surface to the height, the A indicates a coefficient for a height powered by 4, B a coefficient for a height powered by 6, C a coefficient for a height powered by 8, and D a coefficient for a height powered by 10.

The projection lens system for image projection apparatus according to the present invention has an excellent effect in correcting optical aberrations and distortions while reducing the number of lenses compared to the prior art even though plural lenses are still provided therein. That is, the present invention enhances the image aberration correction rate so that images of high resolution and luminance can be implemented. Further, the present invention enables the image projection device in which a projection lens system is provided to be manufactured thinner while preventing the increase of its manufacture cost.

Although the preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A projection lens system for an image projection apparatus, said projection lens system configured to magnify and to project on a screen images reflected from a panel and passed through a prism, said projection lens system comprising:
   a first lens group having first and second spherical lenses of positive refraction power, and movable along an optical axis;
   a second lens group having a third doublet lens formed with a lens of positive refraction power and a lens of negative refraction power in junction to correct chromatic aberration, and a fourth spherical lens being convex on both surfaces thereof to correct spherical aberration;
   a third lens group having fifth and sixth spherical lenses of positive refraction power; and
   a fourth lens group having a seventh spherical lens being concave on both surfaces thereof, an eighth spherical lens of negative refraction power having a concave surface on one side thereof which is opposite to the seventh spherical lens and a convex surface on the other side thereof, and a ninth aspheric lens of negative refraction power having an aspheric surface at least on one side thereof, and arranged for distortion correction,
   wherein the first to fourth lens groups are sequentially arranged on an optical path in a direction toward the screen from the prism.

2. The projection lens system as claimed in claim 1, further comprising a reflection mirror arranged on the optical path between the second lens group and the third lens group, the reflection mirror configured to reflect incident images at a predetermined angle.

3. The projection lens system as claimed in claim 1, wherein an addition refraction power of the first and second lens groups is a positive refraction power.

4. An image display apparatus having a polarizing beam splitter configured to separate R, G, and B video signals reflected from a panel into polarized lights of P and S, a color cube configured to composite the R, G, and B video signals passed through the polarizing beam splitter, and a projection lens system configured to magnify and to project on a screen a composite image passed through the color cube, the projection lens system comprising:

a first lens group having a first spherical lens of positive refraction power, and arranged between the polarizing beam splitter and the color cube;

a second lens group having a second spherical lens of positive refraction power, a third spherical lens of positive refraction power, and a fourth doublet combination lens formed with a lens of positive refraction power and a lens of negative refraction power in junction to correct chromatic aberration, the second lens group being arranged following the color cube;

a third lens group having fifth and sixth spherical lenses of positive refraction power; and a fourth lens group having a seventh spherical lens being concave on both surfaces thereof, an eighth spherical lens of negative refraction power having a concave surface on one side thereof which is opposite to the seventh spherical lens and a convex surface on the other side thereof, and a ninth aspheric lens of negative refraction power having an aspheric surface on at least one side thereof, and arranged for distortion correction, wherein the first to fourth lens groups are sequentially arranged on an optical path in a direction toward the screen from the polarizing beam splitter.

5. The projection lens system as claimed in claim 4, further comprising a reflection mirror arranged on the optical path between the second lens group and the third lens group, the reflection mirror configured to reflect the image at a predetermined angle.

\* \* \* \* \*